(12) United States Patent
Kawano (10) Patent No.: US 12,420,824 B2
(45) Date of Patent: Sep. 23, 2025

(54) ELECTRONIC DEVICE, VEHICLE, DISPLAY CONTROL METHOD, AND STORAGE MEDIUM

(71) Applicant: ISUZU MOTORS LIMITED, Tokyo (JP)

(72) Inventor: Takashi Kawano, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 100 days.

(21) Appl. No.: 18/468,767

(22) Filed: Sep. 18, 2023

(65) Prior Publication Data

US 2024/0101143 A1 Mar. 28, 2024

(30) Foreign Application Priority Data

Sep. 26, 2022 (JP) .................. 2022-152390

(51) Int. Cl.
*B60Q 1/00* (2006.01)
*B60W 50/14* (2020.01)
*G06V 20/58* (2022.01)
(52) U.S. Cl.
CPC .......... *B60W 50/14* (2013.01); *G06V 20/582* (2022.01); *B60W 2050/146* (2013.01); *B60W 2420/403* (2013.01); *B60W 2552/53* (2020.02); *B60W 2554/20* (2020.02); *B60W 2554/802* (2020.02); *B60W 2555/60* (2020.02); *B60W 2556/40* (2020.02)
(58) Field of Classification Search
CPC .......... B60W 50/14; B60W 2050/146; B60W 2420/403; B60W 2552/53; B60W 2554/20; B60W 2554/802; B60W 2555/60; B60W 2556/40; G06V 20/582; G06V 20/588
USPC ....................................... 340/425.5
See application file for complete search history.

(56) References Cited

U.S. PATENT DOCUMENTS

| | | | |
|---|---|---|---|
| 2021/0245747 A1* | 8/2021 | Naithani | ............... B61L 25/025 |
| 2023/0001947 A1 | 1/2023 | Wang et al. | |
| 2023/0043586 A1* | 2/2023 | Lee | ......... B60K 35/65 |
| 2023/0169779 A1* | 6/2023 | Nessler | ................. G01C 21/30 |
| | | | 701/409 |
| 2023/0264707 A1* | 8/2023 | Iwaki | ................. B60W 40/105 |
| | | | 340/441 |

FOREIGN PATENT DOCUMENTS

| | | |
|---|---|---|
| JP | 2004132749 A | 4/2004 |
| JP | 2006078278 A | 3/2006 |
| JP | 2012-248111 A | 12/2012 |
| JP | 2014013496 A | 1/2014 |
| JP | 2017-004492 A | 1/2017 |

(Continued)

*Primary Examiner* — Tai T Nguyen
(74) *Attorney, Agent, or Firm* — Shih IP Law Group, PLLC (57) ABSTRACT

An electronic device includes a storage that stores map information, an acquisition part that acquires a speed limit indicated by a sign included in a captured image generated by a camera included in a vehicle and a position of the vehicle, and a display control part that causes a display part to display the speed limit indicated by the sign included in the captured image, wherein the display control part does not cause the display part to display a speed limit which is acquired by the acquisition part while a distance between the vehicle and a branch point is less than a threshold value.

12 Claims, 5 Drawing Sheets

(56) References Cited

FOREIGN PATENT DOCUMENTS

| | | | |
|---|---|---|---|
| JP | 2020-197862 A | 12/2020 | |
| JP | 2021-146804 A | 9/2021 | |
| JP | 2022-073535 A | 5/2022 | |
| WO | WO-2025022518 A1 * | 1/2025 | ............... G08G 1/09 |

* cited by examiner

| TIMING | POSITION | TYPE |
|---|---|---|
| T1 | P1 | HIGHWAY |
| T2 | P2 | HIGHWAY |
| T3 | P3 | BRANCH ROAD |
| ... | ... | ... |

ELECTRONIC DEVICE, VEHICLE, DISPLAY CONTROL METHOD, AND STORAGE MEDIUM

CROSS-REFERENCE TO RELATED APPLICATIONS

The present application claims priority to Japanese Patent Application number 2022-152390, filed on Sep. 26, 2022, contents of which are incorporated herein by reference in its entirety.

BACKGROUND OF THE INVENTION

Technical Field

The present disclosure relates to an electronic device, a vehicle, a display control method, and a storage medium for acquiring a speed limit suitable for a lane in which a vehicle travels. A conventional system recognizes a speed limit from an image captured by a camera and sets the maximum speed (for example, refer to Japanese Unexamined Patent Application Publication No. 2017-4492).

In the conventional system, there was a problem that a speed limit of a branch road would be set as a speed limit of a main road by detecting the speed limit of the branch road when a vehicle traveling in the main road approaches a branch point.

BRIEF SUMMARY OF THE INVENTION

The present disclosure focuses on this point, and its object is to identify a speed limit suitable for a lane in which a vehicle travels.

An electronic device according to a first aspect of the present disclosure includes: a storage that stores map information; an acquisition part that acquires a speed limit indicated by a sign included in a captured image generated by a camera included in a vehicle and a position of the vehicle; and a display control part that causes a display part to display the speed limit indicated by the sign included in the captured image, wherein the display control part does not need to cause the display part to display a speed limit which is acquired by the acquisition part while a distance between the vehicle and a branch point is less than a threshold value.

A vehicle according to a second aspect of the present disclosure includes: the above mentioned electronic device; and the camera that generates the captured image.

A display control method according to a third aspect of the present disclosure is executed by a processor and includes: acquiring a speed limit indicated by a sign included in a captured image generated by a camera included in a vehicle and a position of the vehicle; and causing a display part to display the speed limit indicated by the sign included in the captured image, wherein causing to display may include not causing the display part to display a speed limit which is acquired while a distance between the vehicle and a branch point is less than a threshold value.

A storage medium according to a fourth aspect of the present disclosure stores a program for causing a processor to execute: acquiring a speed limit indicated by a sign included in a captured image generated by a camera included in a vehicle and a position of the vehicle; and causing a display part to display the speed limit indicated by the sign included in the captured image, wherein causing to display may include not causing the display part to display a speed limit which is acquired while a distance between the vehicle and a branch point is less than a threshold value.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of a Vehicle S>

Figure 1:
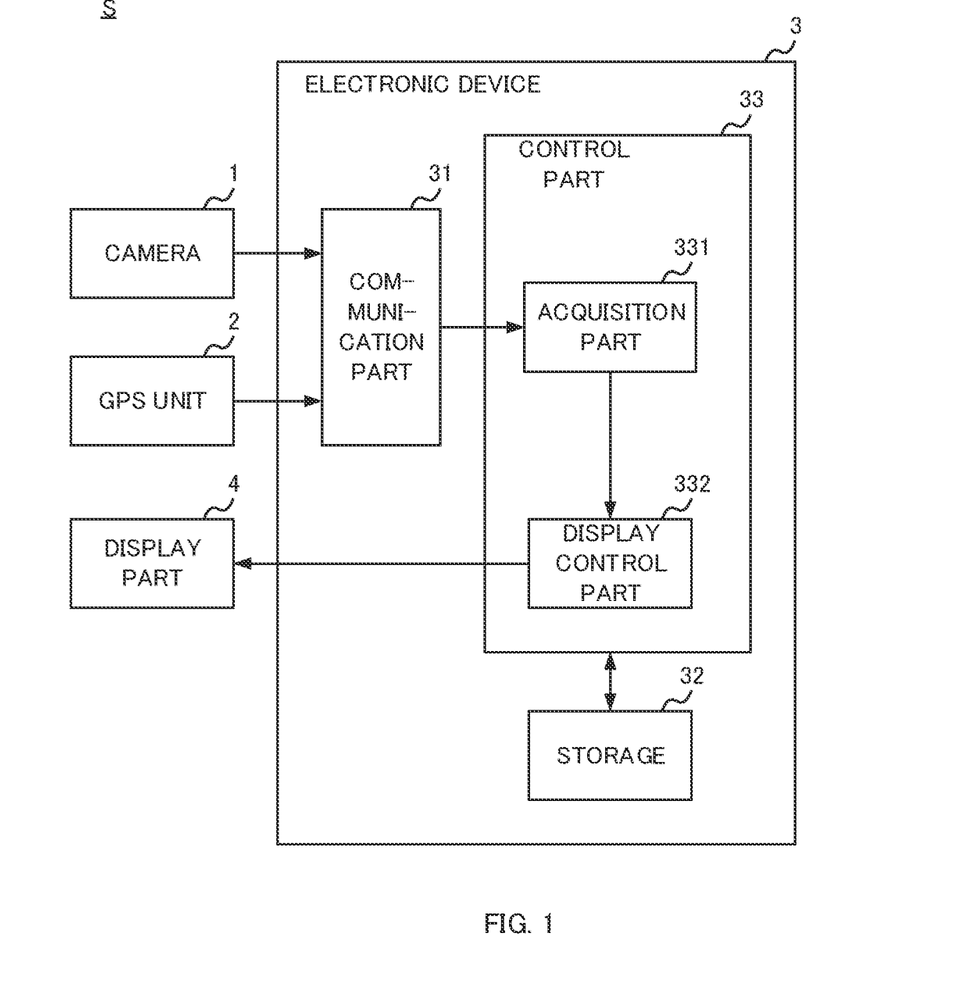
FIG. 1 is a diagram illustrating an outline of a vehicle S according to the present embodiment.

FIG. 1 is a diagram illustrating an outline of a vehicle S according to the present embodiment. The vehicle S shown in FIG. 1 includes a camera 1, a global positioning system (GPS) unit 2, an electronic device 3, and a display part 4. The vehicle S has a function of causing the display part 4, such as a display, to display a speed limit indicated by a sign installed ahead in the traveling direction of the vehicle S.

The camera 1 extracts a sign indicating a speed limit from a captured image generated by capturing a region ahead in the vehicle S's traveling direction, and transmits the speed limit indicated by the extracted sign to the electronic device 3.

The GPS unit 2 receives radio waves transmitted from GPS satellites, and calculates the latitude and longitude on the basis of information included in the received radio waves. The GPS unit 2 transmits the calculated latitude and longitude to the electronic device 3 as position information of the vehicle S (hereinafter referred to as vehicle position information).

The electronic device 3 executes a process of causing the display part 4 to display data, such as an image or text indicating the speed limit, acquired from the camera 1. The electronic device 3 may be in any form. The electronic device 3 may have a housing including electronic components, or may be a printed circuit board on which the electronic components are mounted. In this embodiment, it is assumed that the electronic device 3 is a substrate for a vehicle control on which a processor and a storage are mounted.

The display part 4 is a display that displays a speed, fuel level, time, temperature, or the like, and acquires data indicating a speed limit from the electronic device 3 and displays the data. The display part 4 is provided on an instrument panel of the vehicle S, and it may be provided on an information terminal used by a driver.

With a conventional sign recognition function that displays information about regulation signs included in a captured image, information indicated on a sign installed on a branch road and indicating a speed limit thereof may be displayed when the vehicle S recognizes said sign while traveling on a main road of a highway or the like. Specifically, when the vehicle S traveling on the main road approaches a branch point, the camera 1 extracts a sign of a branch road included in the captured image and transmits the speed limit of the branch road to the electronic device 3, and so the electronic device 3 would cause the display part 4 to display the speed limit of the branch road as a speed limit of the main road.

On the other hand, the electronic device 3 does not display the speed limit acquired from the camera 1 on the display part 4 in a case where a distance between a position of the vehicle S acquired from the GPS unit 2 and a position of a branch point included in map information stored in the electronic device 3 is less than a threshold value. Since the electronic device 3 operates in this manner, it is possible to prevent the speed limit of the branch road from being displayed when the vehicle S travels on the main road. Hereinafter, the configuration and operation of the electronic device 3 will be described in detail.

<Configuration of the Electronic Device 3>

The electronic device 3 includes a communication part 31, a storage 32, and a control part 33. The control part 33 includes an acquisition part 331 and a display control part 332.

The communication part 31 includes a communication device for transmitting and receiving information via a network or a digital signal transmission bus. The communication device is a controller area network (CAN) controller, for example.

The storage 32 includes a storage medium such as a read only memory (ROM), a random access memory (RAM), a hard disk drive (HDD), or solid state drive (SSD). The storage 32 stores a program executed by the control part 33. The storage 32 stores various types of information for displaying data indicating a speed limit on the display part 4. For example, the storage 32 stores map information. The map information includes position information indicating the latitude and longitude of a branch point of a lane.

The control part 33 is a so-called processor such as a central processing unit (CPU) or an electronic control unit (CPU), for example. The control part 33 functions as the acquisition part 331 and the display control part 332 by executing the program stored in the storage 32. The control part 33 may be configured with a single processor, or may be configured with a plurality of processors or a combination of one or more processors and an electronic circuit. The configuration of each unit implemented by the control part 33 will be described below.

The acquisition part 331 acquires (i) a speed limit indicated by the sign included in the captured image generated by the camera 1 included in the vehicle S and (ii) a position of the vehicle S. For example, the acquisition part 331 acquires speed limit information indicating a speed limit from the camera 1, and stores the speed limit information in the storage 32 in association with a timing at which the speed limit information is acquired. The acquisition part 331 acquires vehicle position information indicating the latitude and longitude of the vehicle S from the GPS unit 2, and stores the vehicle position information in the storage 32 in association with a timing at which the vehicle position information is acquired.

Further, the acquisition part 331 calculates, for every acquisition of the vehicle position information, a distance between a position of a branch point ahead in the traveling direction included in the map information and the position of the vehicle S, and stores the calculated distance in the storage 32 in association with a timing at which the vehicle position information is acquired.

Figure 2:
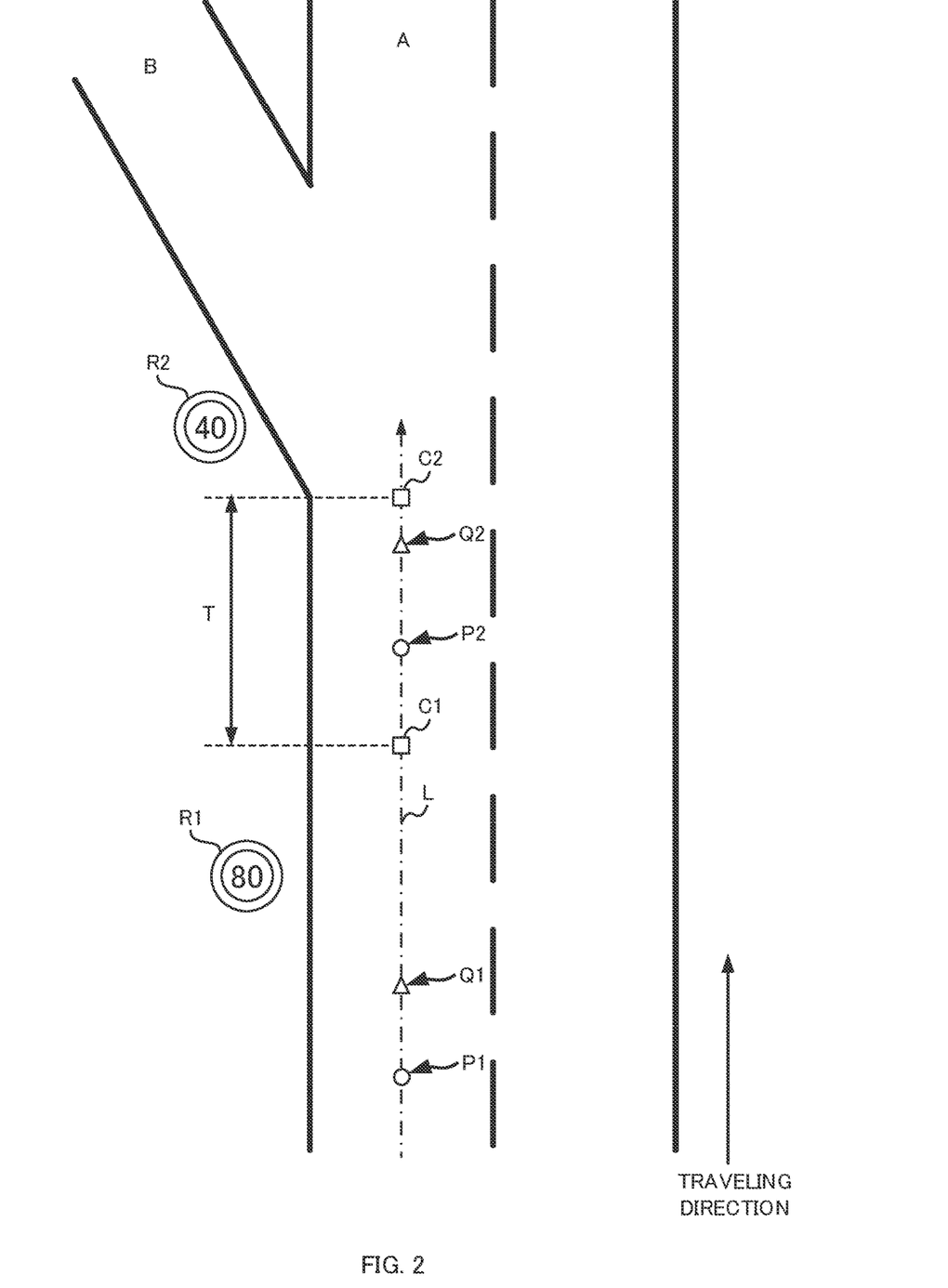
FIG. 2 is a diagram illustrating an example of an operation of an acquisition part 331.

FIG. 2 is a diagram for illustrating an example of an operation of the acquisition part 331. A sign R1 indicating a speed limit of a lane A, which is the main road, and a sign R2 indicating a speed limit of a lane B, which is the branch road, are shown in FIG. 2. A route L (a dashed-and-dotted line) shown in FIG. 2 is a route along which the vehicle S travels, and (i) a position P1 and a position P2 at which the vehicle position information is acquired, (ii) a position Q1 and a position Q2 at each of which a speed limit is acquired, and (iii) a branch point C2 and a position C1 which is a distance T short of the branch point C2 are shown on the route L. The distance T and the position C1 will be described later.

As an example, after calculating, at the position P1, a distance between the position P1 where the vehicle S travels and the branch point C2, the acquisition part 331 acquires, at the position Q1, a speed limit (80 km/h) indicated by the sign R1. Next, after calculating, at the position P2, a distance between the position P2 and the branch point C2, the acquisition part 331 acquires, at the position Q2, a speed limit (40 km/h) indicated by the sign R2.

The display control part 332 causes the display part 4 to display the speed limit indicated by the sign included in the captured image generated by the camera 1. For example, the display control part 332 causes the display part 4 to display a first speed limit acquired by the acquisition part 331 while the vehicle S is traveling at a position at which a distance between the branch point C2 ahead in the traveling direction included in the map information and the vehicle S is equal to or greater than a threshold value.

That is, the display control part 332 causes the display part 4 to display the first speed limit when the vehicle S is traveling at the threshold value or closer to the branch point C2. The threshold value is a distance at which a sign indicating the speed limit of the branch road can be extracted from the captured image generated by the camera 1, or a distance at which the speed limit of the branch road can be identified from the sign included in the captured image. The threshold value is 300 m, for example. In FIG. 2, the threshold value is the distance T between the branch point C2 and the position C1.

As an example, the acquisition part 331 acquires, at the position Q1, the first speed limit (80 km/h) indicated by the sign R1. The display control part 332 causes the display part 4 to display data such as an image or text corresponding to the first speed limit, since the distance calculated by the acquisition part 331 at the position P1 (i.e., the distance between the position P1 and the branch point C2) is equal to or greater than the distance T. Further, the display control part 332 stores the first speed limit in the storage 32.

The display control part 332 does not cause the display part 4 to display the speed limit which is acquired by the acquisition part 331 while the distance between the vehicle S and the branch point C2 is less than the threshold value. For example, the display control part 332 does not cause the display part 4 to display a second speed limit acquired by the acquisition part 331 while the vehicle S is traveling at a position at which the distance between the branch point C2 ahead in the traveling direction included in the map information and the vehicle S is less than the distance T. That is, when the vehicle S is in a predetermined range from the branch point C2, even if the speed limit is identified from the captured image, the display control part 332 does not cause the display part 4 to display the identified speed limit (second speed limit).

As an example, the acquisition part 331 acquires, at the position Q2, the second speed limit (40 km/h) indicated by the sign R2. The display control part 332 does not cause the display part 4 to display data corresponding to the second speed limit, since the distance calculated by the acquisition part 331 at the position P2 (i.e., the distance between the position P2 and the branch point C2) is less than the distance T. Further, the display control part 332 stores the second speed limit in the storage 32. By not having the display control part 332 cause the display part 4 to display the second speed limit, it is possible to prevent displaying the speed limit of the branch road while the vehicle S is traveling on the main road.

Further, while the vehicle S is traveling at a position at which the distance between the branch point C2 ahead in the traveling direction and the vehicle S is less than the distance T, the display control part 332 causes the display part 4 to display the first speed limit which is acquired by the acquisition part 331 when the vehicle S was traveling at the position at which said distance is equal to or greater than the threshold value. For example, the display control part 332 causes the display part 4 to display the first speed limit indicated by the sign R1 acquired by the acquisition part 331 at the position P1, since a distance between the branch point C2 and the position P2 is less than the distance T at the position Q2. Since the display control part 332 operates in this manner, it is possible to display the speed limit suitable for the lane in which the vehicle S travels even while the vehicle S travels at a position close to the branch point.

When the vehicle S traveling in the lane A, which is the main road, makes a lane change from the branch point C2 to the lane B, which is the branch road, for the driver, it is desirable to have the speed limit of the lane B (i.e., 40 km/h indicated by the sign R2 in FIG. 2) be displayed while traveling in the lane B. Therefore, when determining that the vehicle S enters (or has entered) a branch road, the display control part 332 of the present embodiment causes the display part 4 to display a speed limit which is acquired while a distance between the branch point C2 corresponding to said branch road and the vehicle S is less than the distance T.

For example, in FIG. 2, when the type of lane in which the vehicle S travels before passing through the branch point C2 is different from the type of lane in which the vehicle S travels after passing through the branch point C2, the display control part 332 determines that the vehicle S enters (or has entered) the branch road. That is, the display control part 332 causes the display part 4 to display the second speed limit (the second speed limit indicated by the sign R2 shown in FIG. 2) which is acquired by the acquisition part 331 while the vehicle S is traveling at the position at which the distance between the branch point C2 ahead in the traveling direction and the vehicle S is less than the distance T, on condition that the type of lane in which the vehicle S travels before passing through the branch point C2 is different from the type of lane in which the vehicle S travels after passing through the branch point C2.

Figure 3:
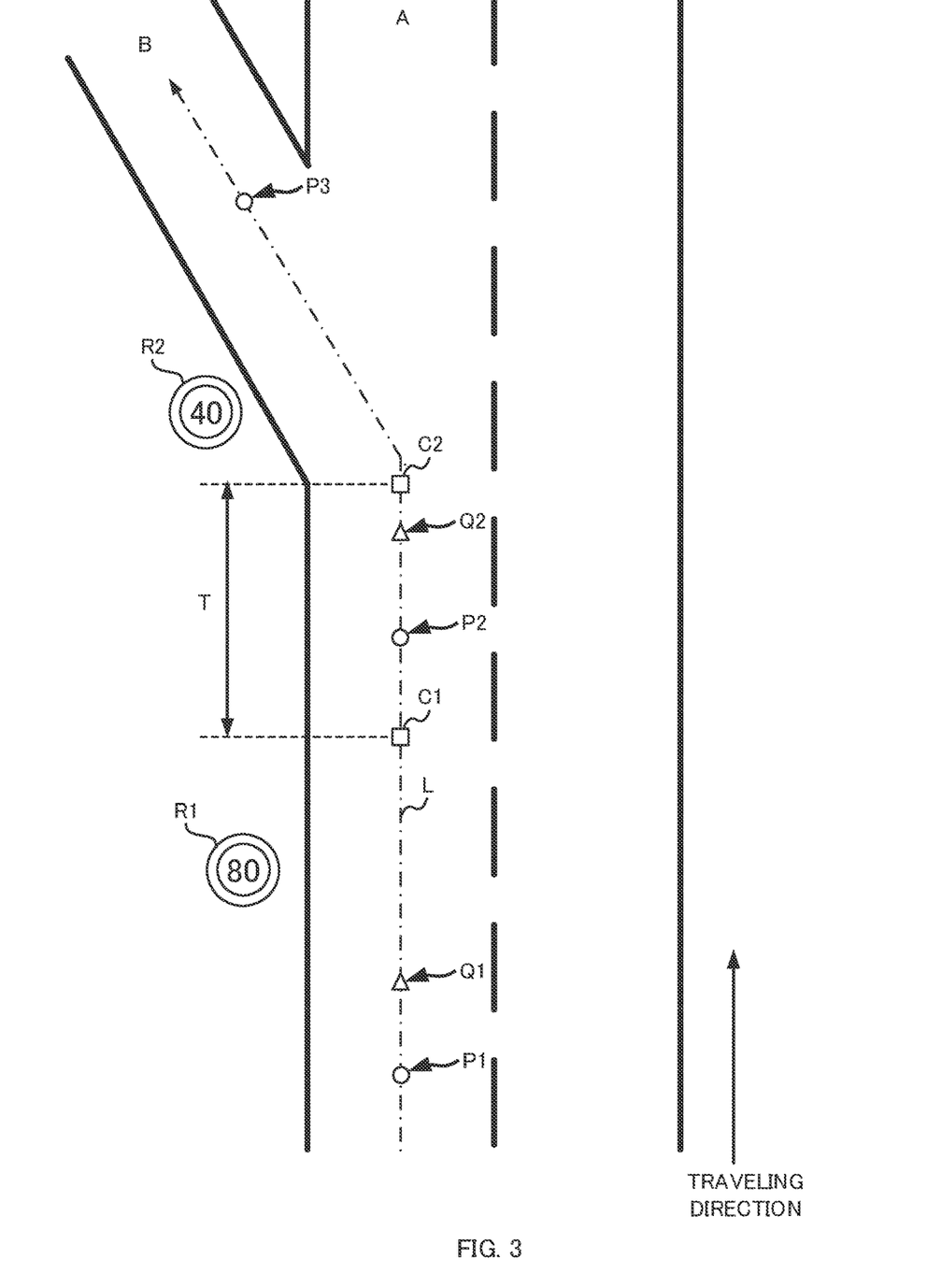
FIG. 3 is a diagram illustrating an operation of the vehicle S traveling in a lane B.
Figure 4:
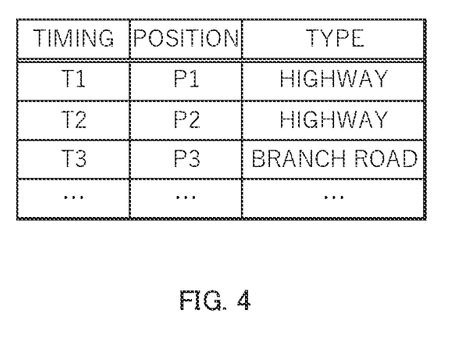
FIG. 4 is a diagram illustrating a position of a vehicle and the type of lane.

FIG. 3 is a diagram illustrating an operation of the vehicle S traveling in the lane B. FIG. 4 is a diagram illustrating a position of a vehicle and the type of lane. FIG. 3 is different from FIG. 2 in points that (i) the route L after the branch point C2 is the lane B and (ii) a position P3 is shown on the route L in the lane B, and is the same with respect to other points. In FIG. 4, a timing, a position acquired by the acquisition part 331, and the type of lane are associated with each other. The display control part 332 can identify the type of lane corresponding to the position of the vehicle S acquired by the acquisition part 331 by referencing a plurality of lane positions included in the map information and the type of lane corresponding to each of the plurality of lane positions.

For example, by referencing the map information stored in the storage 32, the display control part 332 identifies the type "highway" of the lane A corresponding to the position P1, and stores the identified type "highway" of the lane A in the storage 32 in association with (i) a timing T1 at which the acquisition part 331 acquires the position P1 and (ii) the position P1. Similarly, the display control part 332 stores the type "highway" of the lane A in the storage 32 in association with a timing T2 and the position P2.

Next, the display control part 332 causes the display part 4 to display the second speed limit (40 km/h) indicated by the sign R2 acquired at the position Q2, since the type "branch road" of the lane B identified at the position P3 is different from the type "highway" of the lane A corresponding to the position P2 before passing through the branch point C2. Since the display control part 332 operates in this manner, when the vehicle S changes lanes, it is possible to display the speed limit suitable for the lane in which the vehicle S travels after the lane change.

Further, the display control part 332 may determine whether the type of lane in which the vehicle S travels before passing through the branch point C2 is different from the type of lane in which the vehicle S travels after passing through the branch point C2, on condition that a turn signal of the vehicle S is operating when the vehicle S travels through the position at which the distance between the branch point C2 ahead in the traveling direction and the vehicle S is less than the distance T. That is, in a case where the turn signal is operating when the vehicle S is approaching close to the branch point C2, the display control part 332 determines, after the vehicle S has reached the branch point C2, whether the type of lane before passing through the branch point C2 is different from the type of lane after passing through the branch point C2. Since the display control part 332 operates in this manner, a processing load can be reduced because a determination of whether the type of lane has changed is not performed when the vehicle S does not travel on a branch road.

Further, the display control part 332 may cause the display part 4 to display (i) the second speed limit which is acquired while the vehicle S is traveling at the position at which the distance between the branch point C2 ahead in the traveling direction and the vehicle S is less than the distance T by the acquisition part 331 and (ii) the type of the lane in which the vehicle S travels after passing through the branch point C2. For example, the display control part 332 causes the display part 4 to display, at the position P3, data corresponding to the second speed limit acquired at the position Q2, and data such as an image or text indicating the type "branch road" of the lane B where the position P3 is located. Since the display control part 332 operates in this manner, the driver can come to know whether the speed limit displayed on the display part 4 is the speed limit of the lane in which his/her vehicle travels.

Further, in a case where the turn signal of the vehicle S is operating when the vehicle S is traveling at the position at which the distance between the branch point C2 ahead in the traveling direction and the vehicle S is less than the distance T, the display control part 332 may cause the display part 4 to display a speed limit acquired by the acquisition part 331 when the vehicle S was traveling at the position at which the distance between the branch point C2 and the vehicle S is less than the distance T since a timing at which the vehicle S travels a position before the branch point C2 in the traveling direction of the vehicle S. When the turn signal is operating, it is highly likely that the driver of the vehicle S will cause the vehicle S to enter into a branch road. Therefore, in such a case, even if the distance between the branch point C2 and the vehicle S is less than the distance T, the display control part 332 causes the display part 4 to display the acquired speed limit indicated by the sign R2.

This prevents the driver from erroneously recognizing the speed limit of the branch road for the speed limit of the main road when he/she is traveling on the main road, and this makes it easier for the driver to recognize the speed limit of the branch road when the vehicle S is about to enter the branch road. In the above determination, in addition to the operation of the turn signal, the magnitude of an operation angle of a stirring wheel can be added to the determination conditions.

<Processing Sequence in the Electronic Device 3>

Figure 5:
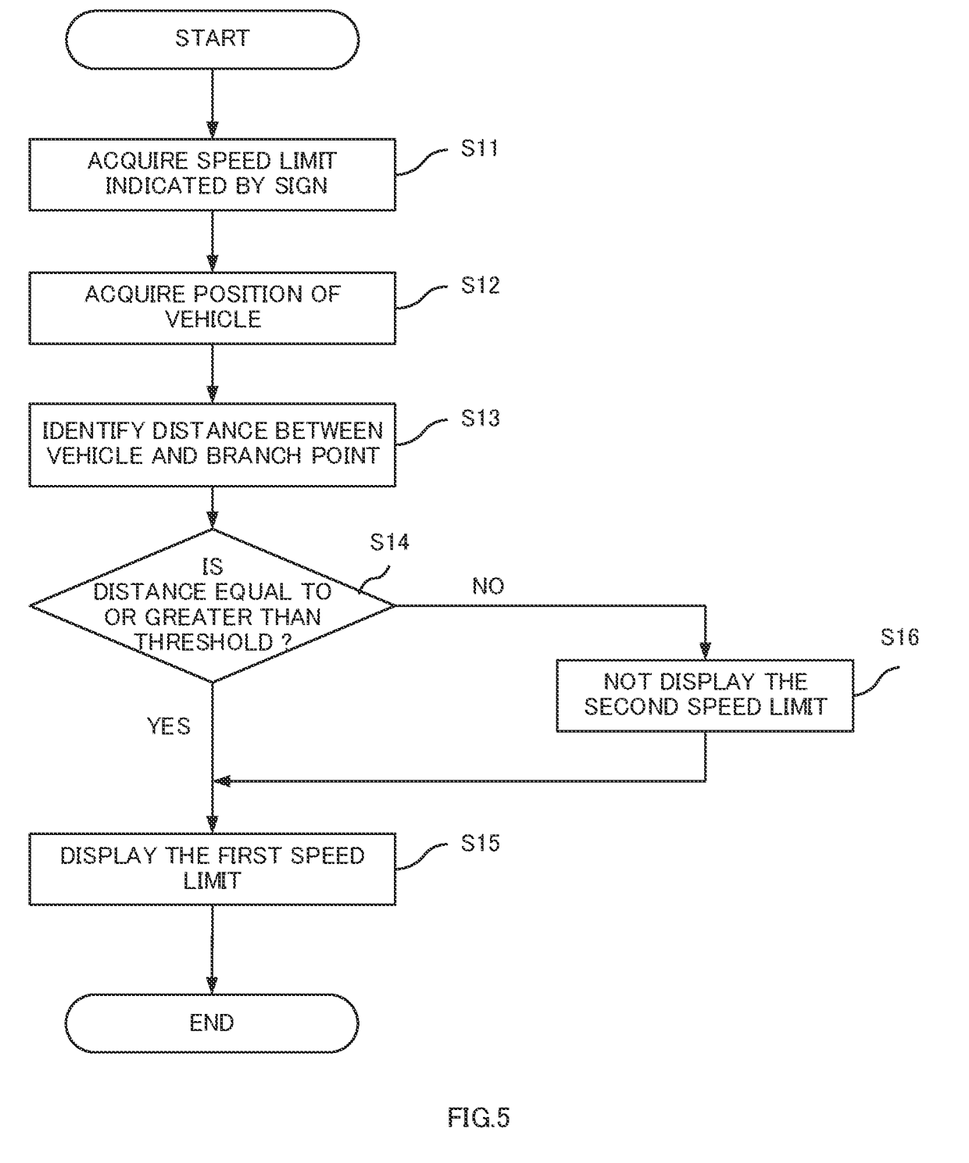
FIG. 5 is a diagram illustrating an example of a processing sequence in an electronic device 3.

FIG. 5 is a diagram showing an example of a processing sequence in the electronic device 3. The processing sequence shown in FIG. 5 shows, as an example, an operation from acquiring a speed limit indicated by a sign ahead in the traveling direction until displaying said speed limit.

The acquisition part 331 acquires a speed limit indicated by a sign ahead in the vehicle S's traveling direction from the camera 1 (S11), and acquires vehicle position information indicating a position of the vehicle S from the GPS unit 2 (S12). The acquisition part 331 identifies a distance between a position of the branch point C2 ahead in the vehicle S's traveling direction included in map information stored in the storage 32 and the position of the vehicle S acquired from the GPS unit 2 (S13).

If the distance identified by the acquisition part 331 is equal to or greater than a threshold value (distance T shown in FIG. 2) (YES in S14), the display control part 332 causes the display part 4 to display the speed limit (first speed limit) acquired in step S11 (S15).

If the distance identified by the acquisition part 331 is less than the distance T (NO in S14), the display control part 332 does not display the speed limit (second speed limit) acquired in step S11 (S16). Next, the display control part 332 causes the display part 4 to display the speed limit (first speed limit) acquired while traveling at a position at which the distance identified by the acquisition part 331 is equal to or greater than the distance T (S15).

<Effect of the Electronic Device 3>

As described above, the electronic device 3 includes the storage 32 that stores map information, the acquisition part 331 that acquires the speed limit indicated by the sign included in the captured image generated by the camera 1 included in a vehicle and the position of the vehicle, and the display control part 332 that causes the display part 4 to display the speed limit indicated by the sign included in the captured image. The display control part 332 does not cause the display part 4 to display the speed limit which is acquired by the acquisition part 331 while the distance between the vehicle and a branch point is less than the threshold value.

By configuring the electronic device 3 in this manner, it is possible to prevent the speed limit of the branch road from being displayed on the display part 4 while the vehicle S is traveling on the main road, and therefore a speed limit suitable for the lane in which the vehicle S travels can be displayed. As a result, the driver can come to know the speed limit suitable for the lane in which his/her vehicle is traveling.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. An electronic device comprising:
a storage that stores map information;
an acquisition part that acquires a speed limit indicated by a sign included in a captured image generated by a camera included in a vehicle and a position of the vehicle; and
a display control part that causes a display part to display the speed limit indicated by the sign included in the captured image,
wherein the display control part does not cause the display part to display a speed limit which is acquired by the acquisition part while a distance between the vehicle and a branch point is less than a threshold value, and
wherein the display control part causes the display part to display the speed limit which is acquired by the acquisition part while the distance between the vehicle and the branch point is less than the threshold value, when it is determined that the vehicle enters a branch road.

2. A vehicle comprising:
the electronic device according to claim 1; and
the camera that generates the captured image.

3. An electronic device comprising:
a storage that stores map information;
an acquisition part that acquires a speed limit indicated by a sign included in a captured image generated by a camera included in a vehicle and a position of the vehicle; and
a display control part that causes a display part to display the speed limit indicated by the sign included in the captured image,
wherein the map information includes a plurality of lane positions and a type of lane corresponding to each of the plurality of lane positions,
wherein the display control part does not cause the display part to display a speed limit which is acquired by the acquisition part while a distance between the vehicle and a branch point is less than a threshold value, and
wherein the display control part causes the display part to display the speed limit which is acquired by the acquisition part while the vehicle is traveling at a position at which the distance is less than the threshold value, on condition that a type of lane in which the vehicle travels before passing through the branch point is different from a type of lane in which the vehicle travels after passing through the branch point.

4. The electronic device according to claim 3, wherein the display control part causes the display part to display the speed limit which is acquired by the acquisition part while the vehicle is traveling at the position at which the distance is less than the threshold value, and the type of lane in which the vehicle travels after passing through the branch point.

5. A vehicle comprising:
the electronic device according to claim 3; and
the camera that generates the captured image.

6. An electronic device comprising:
a storage that stores map information;
an acquisition part that acquires a speed limit indicated by a sign included in a captured image generated by a camera included in a vehicle and a position of the vehicle; and
a display control part that causes a display part to display the speed limit indicated by the sign included in the captured image,
wherein the display control part does not cause the display part to display a speed limit which is acquired by the acquisition part while a distance between the vehicle and a branch point is less than a threshold value,
wherein the threshold value is a distance at which a sign indicating a speed limit of the branch road can be extracted from a captured image generated by the camera of the vehicle, or a distance at which the speed limit of the branch road can be identified from the sign included in the captured image, and
wherein the display control part determines that the vehicle has entered the branch road when identifying that a type of lane in which the vehicle travels before passing through the branch point and a type of lane in which the vehicle travels after passing through the branch point are different, by referencing a plurality of lane positions included in the map information stored in the storage and a type of lane corresponding to each of the plurality of lane positions, and causes the display part to display the speed limit which is acquired by the acquisition part while the vehicle is traveling at a position at which the distance is less than the threshold value.

7. A vehicle comprising:
the electronic device according to claim 6; and
the camera that generates the captured image.

8. An electronic device comprising:
a storage that stores map information;
an acquisition part that acquires a speed limit indicated by a sign included in a captured image generated by a camera included in a vehicle and a position of the vehicle; and
a display control part that causes a display part to display the speed limit indicated by the sign included in the captured image,
wherein the display control part does not cause the display part to display a speed limit which is acquired by the acquisition part while a distance between the vehicle and a branch point is less than a threshold value, and
wherein the display control part causes the display part to display the speed limit which is acquired by the acquisition part while the vehicle is traveling at a position at which the distance is less than the threshold value, on condition that a turn signal of the vehicle is operating when the vehicle is traveling at the position at which the distance is less than the threshold value.

9. The electronic device according to claim 8, wherein the display control part causes the display part to display the speed limit which is acquired by the acquisition part while the vehicle is traveling at the position at which the distance is less than the threshold value since a timing at which the vehicle is traveling at a position before the branch point in the traveling direction of the vehicle in a case where the turn signal is operating when the vehicle is traveling at the position at which the distance is less than the threshold value.

10. A vehicle comprising:
the electronic device according to claim 8; and
the camera that generates the captured image.

11. A display control method executed by a processor and comprising:
storing map information in a storage;
acquiring a speed limit indicated by a sign included in a captured image generated by a camera included in a vehicle and a position of the vehicle; and
causing a display part to display the speed limit indicated by the sign included in the captured image,
wherein the map information includes a plurality of lane positions and a type of lane corresponding to each of the plurality of lane positions,
wherein the causing to display includes not causing the display part to display a speed limit which is acquired while a distance between the vehicle and a branch point is less than a threshold value, and
wherein the causing to display includes causing the display part to display the speed limit which is acquired while the vehicle is traveling at a position at which the distance is less than the threshold value, on condition that a type of lane in which the vehicle travels before passing through the branch point is different from a type of lane in which the vehicle travels after passing through the branch point.

12. A storage medium that stores a program for causing a processor to execute:
storing map information in a storage;
acquiring a speed limit indicated by a sign included in a captured image generated by a camera included in a vehicle and a position of the vehicle; and
causing a display part to display the speed limit indicated by the sign included in the captured image,
wherein the map information includes a plurality of lane positions and a type of lane corresponding to each of the plurality of lane positions,
wherein the causing to display includes not causing the display part to display a speed limit which is acquired while a distance between the vehicle and a branch point is less than a threshold value, and
wherein the causing to display includes causing the display part to display the speed limit which is acquired while the vehicle is traveling at a position at which the distance is less than the threshold value, on condition that a type of lane in which the vehicle travels before passing through the branch point is different from a type of lane in which the vehicle travels after passing through the branch point.

* * * * *